US011913614B2

(12) United States Patent

Monsonego

(10) Patent No.: US 11,913,614 B2

(45) Date of Patent: Feb. 27, 2024

(54) LIGHTING UNIT PROJECTING BOTH DIFFUSED AND CONCENTRATED LIGHT

(71) Applicants: FORMA LIGHTING ITALIA S.R.L., Milan (IT); FORMA LIGHTING (HK) LIMITED, Hong Kong (HK)

(72) Inventor: Michael Monsonego, Hong Kong (HK)

( * ) Notice: Subject to any disclaimer, the term of this patent is extended or adjusted under 35 U.S.C. 154(b) by 20 days.

(21) Appl. No.: 17/770,350

(22) PCT Filed: Oct. 19, 2020

(86) PCT No.: PCT/IB2020/059800

§ 371 (c)(1),
(2) Date: Apr. 20, 2022

(87) PCT Pub. No.: WO2021/079249

PCT Pub. Date: Apr. 29, 2021

(65) Prior Publication Data

US 2022/0397247 A1 Dec. 15, 2022

(30) Foreign Application Priority Data

Oct. 21, 2019 (IT) ........................ 102019000019409

(51) Int. Cl.

| | |
|---|---|
| ***F21S 4/28*** | (2016.01) |
| ***F21V 3/04*** | (2018.01) |
| ***F21V 5/00*** | (2018.01) |
| *F21Y 115/10* | (2016.01) |

(52) U.S. Cl.

CPC ................ *F21S 4/28* (2016.01); *F21V 3/049* (2013.01); *F21V 5/007* (2013.01); *F21Y 2115/10* (2016.08)

(58) Field of Classification Search

CPC .......... F21S 4/28; F21V 5/007; F21V 15/013; F21K 9/20; F21K 9/232; F21K 9/233; F21K 9/237

See application file for complete search history.

(56) References Cited

U.S. PATENT DOCUMENTS

| | | | | |
|---|---|---|---|---|
| 5,810,468 | A * | 9/1998 | Shimada | F21S 8/032<br>362/249.06 |
| 7,244,058 | B2 * | 7/2007 | DiPenti | F21V 29/505<br>362/547 |
| 7,267,459 | B2 * | 9/2007 | Matheson | F21V 31/00<br>362/240 |
| 8,157,420 | B2 * | 4/2012 | Song | F21V 21/30<br>362/373 |
| 8,436,375 | B2 * | 5/2013 | Miura | F21V 19/0035<br>257/E33.056 |
| 9,933,139 | B2 * | 4/2018 | Skergeth | F21V 23/007 |
| 10,701,772 | B2 * | 6/2020 | Schmidt | F21V 5/04 |
| 11,125,397 | B2 * | 9/2021 | Bryan | F21S 4/28 |
| 11,619,359 | B2 * | 4/2023 | Castillo Recatala | F21S 4/28<br>362/249.02 |
| 2012/0113634 | A1 * | 5/2012 | Wong | F21V 23/009<br>362/249.02 |

* cited by examiner

*Primary Examiner* — Ismael Negron

(57) ABSTRACT

A lighting unit includes an extruded container body; a plurality of first light sources and a plurality of second light sources, arranged in the container body on at least one printed circuit board; a power supply for the light sources; diffusion optics for diffusing light emitted by the first light sources; and concentrating optics for concentrating light emitted by the second sources.

37 Claims, 5 Drawing Sheets

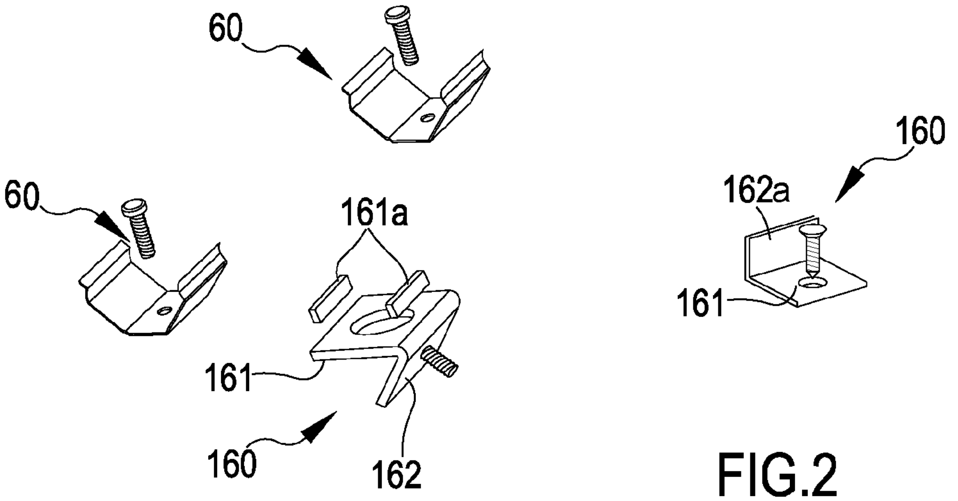
FIG.2
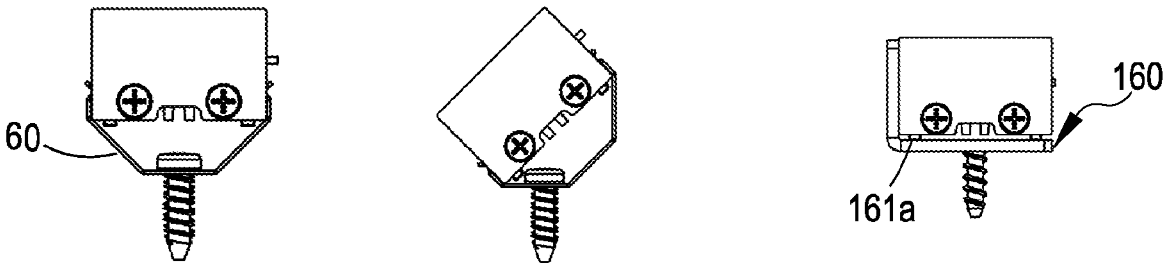

LIGHTING UNIT PROJECTING BOTH DIFFUSED AND CONCENTRATED LIGHT

CROSS-REFERENCE TO RELATED APPLICATIONS

The present application is a national stage entry of International patent application no. PCT/IB2020/059800, filed on Oct. 19, 2020, which claims priority to Italian patent application no. 102019000019409, filed on Oct. 21, 2019, both of which are incorporated in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

AN INCORPORATION BY REFERENCE STATEMENT FOR SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The subject matter of the present invention is a lighting unit comprising at least a diffused light source and at least a concentrated light source.

The need to light different objects with a respective different lighting, which can be of either diffused or concentrated type, e.g. for lighting specific details, or a combination of the two lighting types, is known in the art.

BRIEF SUMMARY OF THE INVENTION

Therefore, the technical problem arises of making a lighting unit able to deliver both diffused and concentrated light.

It is also required that such device should have compact dimensions, allow an easy and cost-effective manufacturing and assembling process, as well as be easily installable at any user employing normal standardized connection means.

According to the present invention, such results are achieved by a lighting unit according to the herein described subject matter.

BRIEF DESCRIPTION OF THE SEVERAL VIEWS OF THE DRAWING

Further details may be derived from the following description of a non-limiting exemplary embodiment of the object of the present invention, made with reference to the accompanying drawings, which show:

in FIG. 2: perspective views of means for performing fastening of the unit of FIG. 1 to walls or the like;

DETAILED DESCRIPTION OF THE INVENTION

Figure 1:
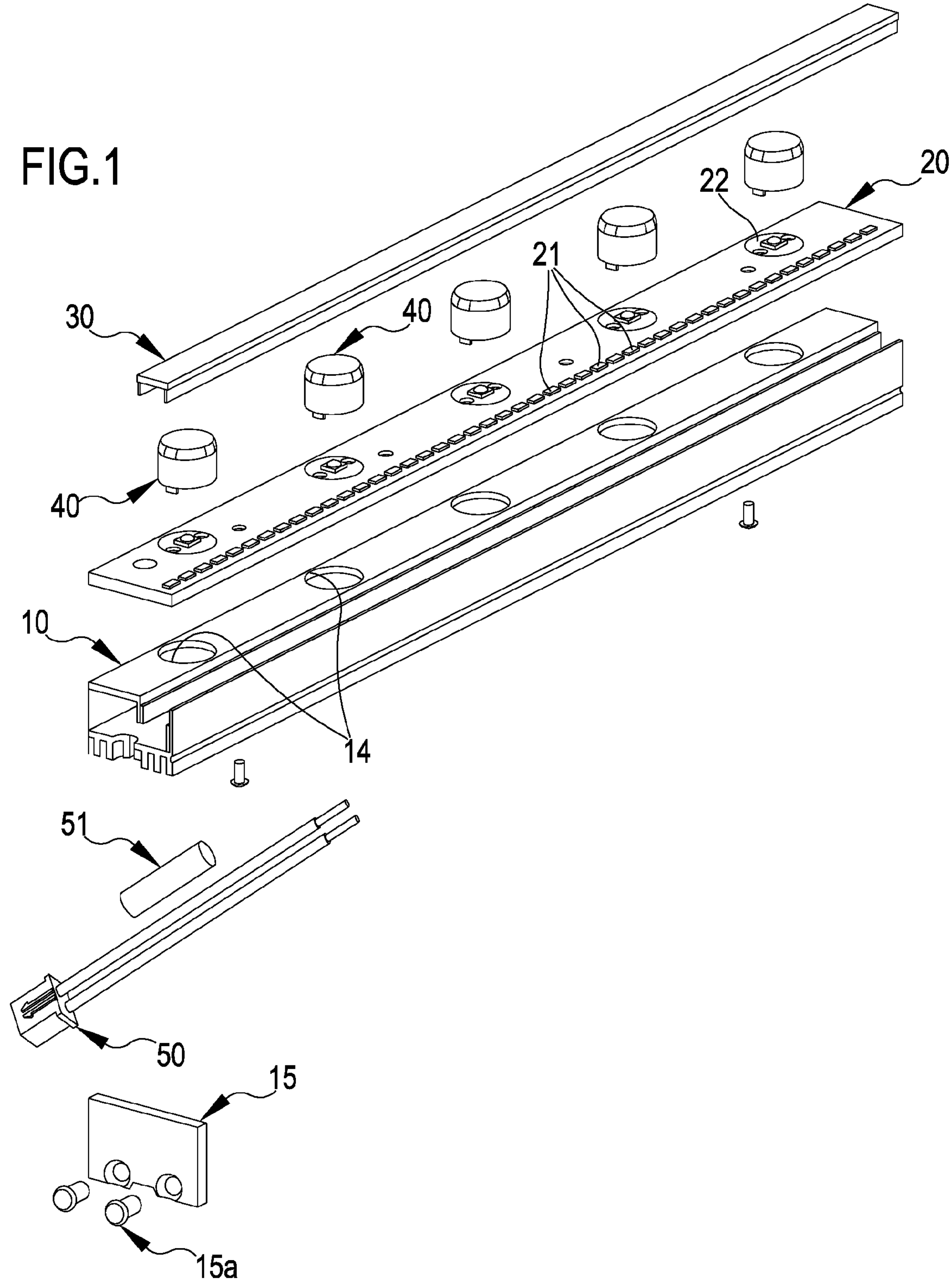
in FIG. 1: an exploded perspective view of an exemplary embodiment of a lighting unit according to the present invention.
Figure 3:
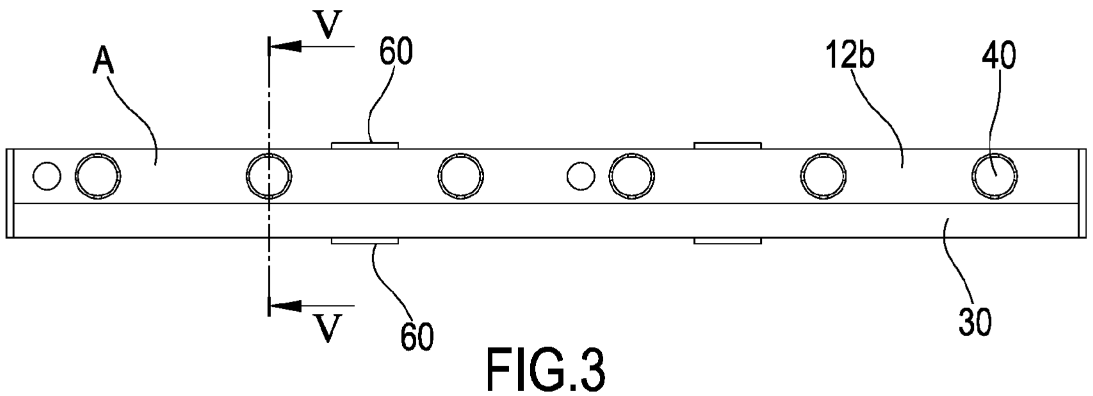
in FIG. 3: a front view from the front side of the lighting unit of FIG. 1 assembled and closed.
Figure 4:
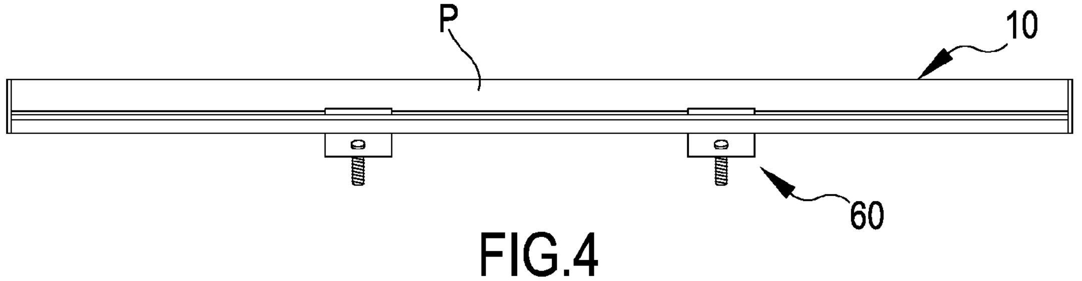
in FIG. 4: a front view from the rear side of the lighting unit of FIG. 3.

As illustrated in FIG. 1, and hereby assuming merely for descriptive purposes and without any limiting meaning a reference triad with a respective longitudinal length-wise direction X-X; transverse width-wise direction Y-Y; and vertical height-wise direction Z-Z of the lighting unit; as well as a front part A corresponding to the light emitting part, and an opposite rear blind part P, the lighting unit according to the invention substantially comprises:

- a container body 10, preferably made by means of extrusion;
- a series of first light sources 21 and a series of second light sources 22 supported on at least one printed circuit board 20 and preferably arranged on parallel and preferably coplanar planes;
- power supply means 50, 51 for supplying power to the light sources 21 and 22;
- diffusion optical means for diffusion of the light emitted by the first light sources 21, comprising for example a diffuser 30;
- concentrating and/or directing optical means 40 for concentrating and/or directing the light emitted by the second light sources 22 supported on the printed circuit board, comprising for example concentrating lenses.

A light source is intended as a unit formed by one or more light emitting devices, such as LEDs, arranged and configured to emit a light beam.

The first light sources 21 are arranged on a printed circuit board 20 and are aligned along a first axis parallel to the longitudinal direction X-X. The relative distance between the first light sources 21 may generally be such as to cause a substantially continuous and/or uniform emission of light through the diffusion means along the longitudinal extension of the series of first light sources.

The second light sources 22 are arranged on a printed circuit board and aligned along a second axis parallel to the longitudinal direction X-X.

As an example, the second light sources 22 are formed by LEDs and are arranged in the longitudinal direction X-X at a predetermined relative distance, preferably significantly bigger than the distance between the first light sources 21, such as to allow association of a respective optical element 40 of said concentrating and/or directing optical means to each second light source.

It is understood that the relative distance between adjacent second light sources may not be constant.

Preferably, the first and second light sources are arranged on the same plane, more preferably on a same printed circuit board, as will be appreciated hereinafter.

The diffusion optical means and the concentrating and/or directing optical means are configured to be mounted on the container body so as to suitably either diffuse or concentrate/direct the light beams emitted by the respective first and second light sources 21, 22.

Figure 5:
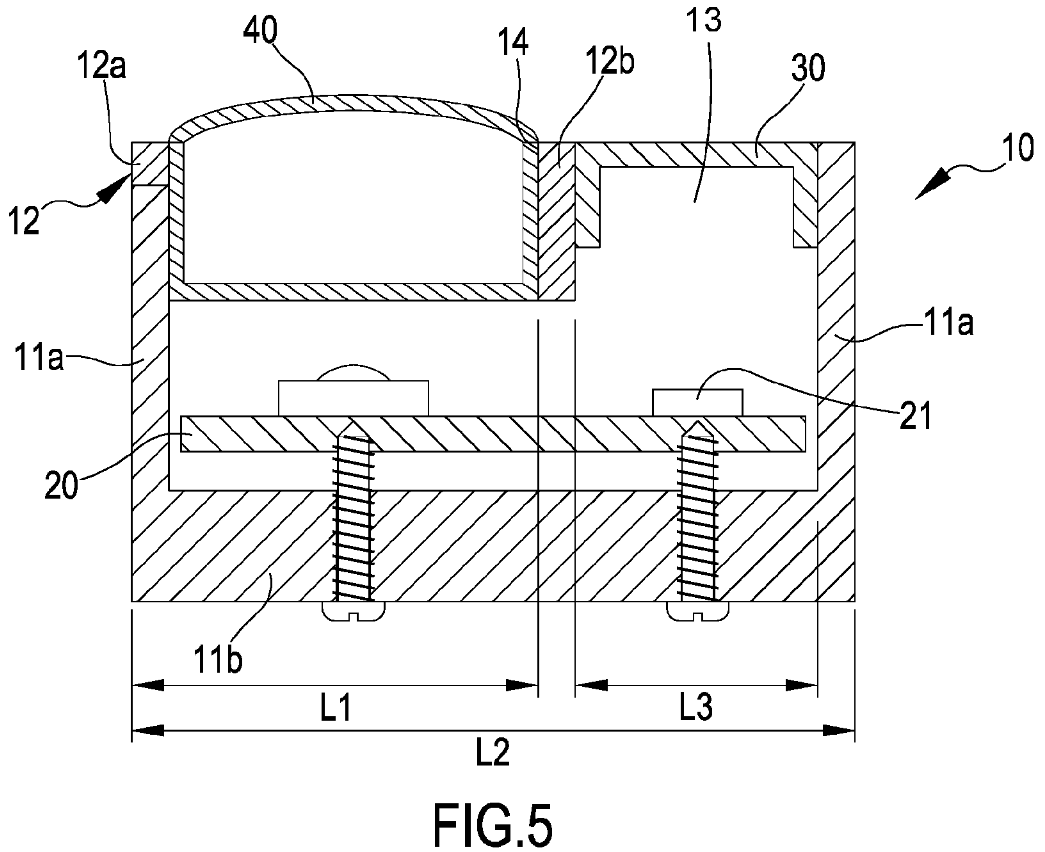
in FIG. 5: a cross-section along the line V-V of FIG. 3.

In greater detail, a preferred embodiment of the container body 10 (FIGS. 1 and 5) has a cross-section formed by a first half-body 11 in the form of a "U" with arms 11*a* and a base 11*b*, and a second half-body 12 in the form of an "overturned L" with a long side 12*a* and a short side 12*b*; the long side 12*a* is connected to one of the arms 11*a* of the "U"; the exemplary representation of FIG. 1 shows the arms 11*a* of the "U" and the arm 12*b* of the "L" as parallel to the vertical direction Z-Z, the base 11*b* of the "U" being parallel to the transverse direction Y-Y.

The long arm 12*a* of the "L" preferably has a length L1 smaller than the length L2 of the base 11*b*, so as to leave an empty interspace 13 with a length L3 between said vertical arm 12*b* and the opposite vertical arm 11*a* of the "U", the interspace thus being open towards the front part A of the lighting unit.

The transverse width Y-Y of the printed circuit board 20 is preferably slightly smaller than the width L2 of the base of the "U", so as to be easily insertable within the latter in a longitudinal direction.

The first light sources 21 are arranged on the printed circuit board and aligned to a first axis parallel to the longitudinal direction X-X, so as to occupy an area with a width in the transverse sense (Y-Y) which underlies and preferably substantially corresponds to that (L3) of the interspace (13), in order to cause an emission of light substantially along the entire length of the lighting unit. The first alignment axis of the first light sources on the printed circuit board may be offset in the transverse direction Y-Y with respect to the centre line longitudinal axis of the interspace 13.

The second light sources 22 are arranged on the printed circuit board 20 aligned along a second axis parallel to the longitudinal direction X-X, and so as to occupy an area in the transverse sense Y-Y having a width substantially comprised within the width L2 of the transverse arm 12*a* of the "overturned L" 12.

The interspace 13 may be closed at its front side by the diffuser 30, which causes a diffusion to the outside environment of the light emitted by the first light sources 21, said emission of light thus being substantially continuous and/or uniform along the longitudinal extension of the first light sources. Each second light source 22 is associated with a respective concentrating and/or directing optical element 40, for example comprised of one or more lenses and/or reflectors, inserted in a respective suitable opening 14 of the container body 10; the openings 14 are in particular configured such that, once the lighting unit is assembled, each opening, as well as its respective optical element 40, are coaxial to the respective second light source, so as to suitably concentrate and/or direct the respective beam of emitted light.

The lighting unit further comprises power supply means 50, 51 designed to cause the emission by the first and/or second light sources, which may for example be LEDs, designed to emit white and/or coloured RGB light.

Furthermore, the power supply means are preferably designed to control a light intensity emitted by the first and/or second light sources, and in particular to individually control each of the second sources for selectively controlling the intensity of the light beam emitted therefrom (dimming) and/or for controlling the first light sources to determine at least an overall intensity of the diffused light emitted by the first sources through the associated diffusion optical means.

Furthermore, it is possible to provide manually accessible switches on the rear side of the container body, for individually controlling the switching on/off of respective one or more second light sources.

Once the lighting unit has been assembled, it is closed by end plugs 15 fixed by means of screws 15*a*.

It is also envisaged that the lighting unit may comprise fixing means 60 for performing fixing to surfaces such as walls, parts of furniture or the like; said fixing means comprising a spring in the form of a shaped bracket designed to engage with the unit and provided with a hole for receiving a fastening screw for fastening to the surface to which it must be applied. As illustrated in FIG. 2, the bracket-shaped spring 60 may have a hole arranged in a central or asymmetric position, designed to fix the lighting unit parallel or inclined with respect to the target surface.

As illustrated in FIG. 2, a second embodiment of the fixing means 160 for performing fixing to a surface is envisaged, in this case comprising a bracket with one side 161 designed to be arranged parallel to the rear or bottom surface of the lighting unit to which it is fixed by magnets 161*a*. A second side 162; 162*a* of the bracket may either be inclined at a suitable acute/obtuse angle and provided with a hole for receiving a screw for performing fastening to the surface, thereby allowing a different orientation of the emitted light, or it may be orthogonal to the first side 161 and designed to be coupled to the other (rear or bottom) surface of the container body, to form an L-shaped fixing bracket. Preferably, the long side 161 of the "L" designed to be coupled to the bottom surface of the container body is provided with a hole for performing fastening to a target surface by means of screws.

According to preferred embodiments, it is envisaged that the lighting unit may be provided with control means for remotely adjusting the intensity, colour and/or orientation of the light emitted by each light source.

Said remote control means, which may for example be connected to the lighting unit, in particular to the power supply means 50, by means of Bluetooth technology, are known in the art are therefore not described in further detail herein.

Figure 6:
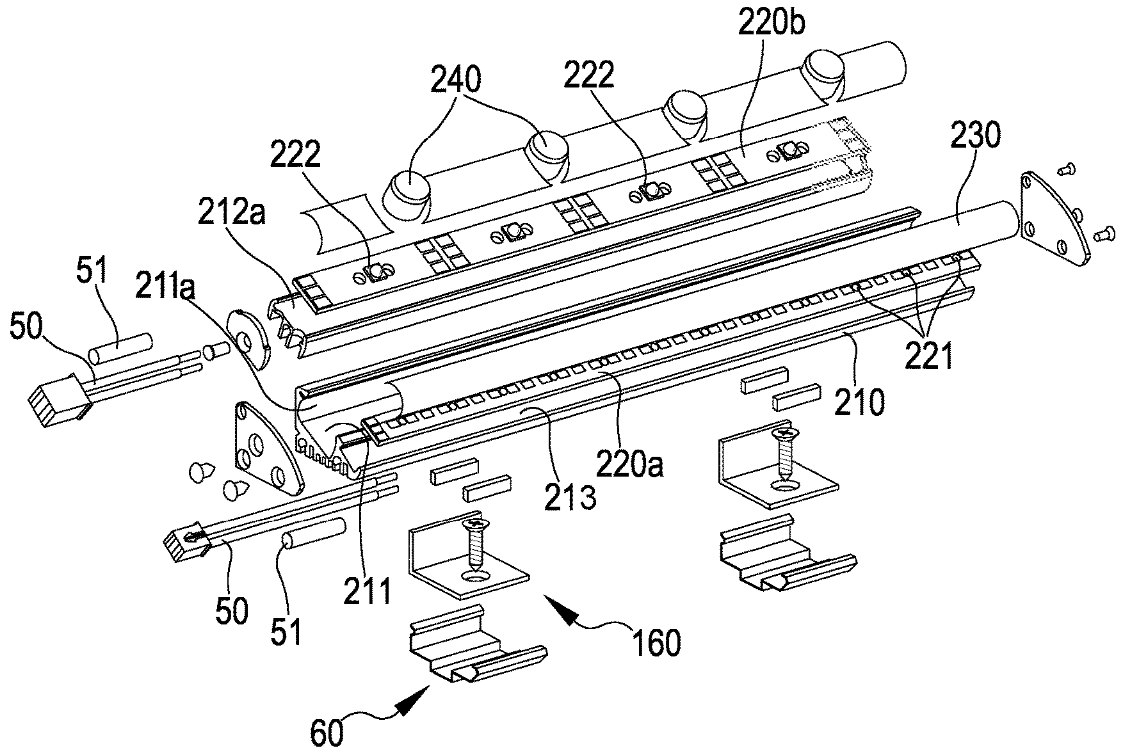
in FIG. 6: an exploded perspective view of a second exemplary embodiment of a lighting unit according to the present invention.
Figure 7:
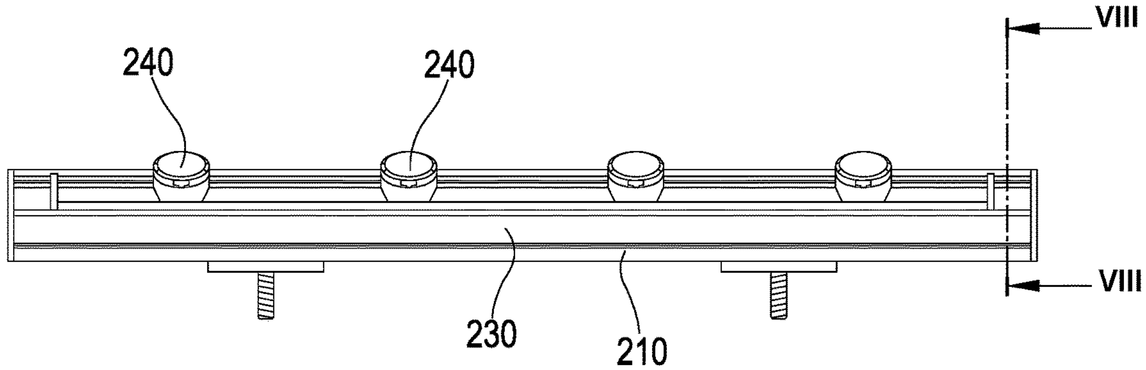
in FIG. 7: a front view of the lighting unit of FIG. 6 in an assembled state.

FIG. 6 shows a second exemplary embodiment of a lighting unit according to the present invention, wherein the series of first light sources 221 and the series of second light sources 222 are arranged on a respective printed circuit board 220*a*, 220*b*.

The two printed circuit board 220*a*, 220*b* are arranged on parallel planes, preferably coplanar, and are housed in respective different longitudinal seats 213, 211 of the container body 210.

The container body 210 may be advantageously formed by means of extrusion. The planes of the printed circuit boards and the seats 213, 211 are preferably inclined with respect to the vertical direction Z-Z and the transverse direction Y-Y.

Preferably, a housing seat 212*a* for housing the printed circuit board supporting the series of second light sources 222 is formed in a contoured body 212 on which optical elements 40 associated with the second light sources, and optionally also middle panels for covering a space between adjacent series of second light sources 222 may be mounted, so that the series of second light sources 222 and the respective optical elements 40 may be assembled on the contoured body 212 to form a single body, and may be inserted in an assembled state in the respective longitudinal seat 211 of the container body 210. Advantageously, the contoured body 212 may be housed in the longitudinal seat 211 of the container body so as to be rotatable therein around an axis parallel to the longitudinal direction, in particular within a certain rotation range and in two opposite rotation directions.

Therefore, it is possible to easily achieve a light orientation of the series of second light 222 around the longitudinal axis, within a certain range, achieving the so-called tilt function.

The rotatable housing of the contoured body 212 (assembled with the second light sources and the respective optical element) in the longitudinal seat 211 of the container body 210 is preferably achieved by means of a form-fit coupling between the seat 211 and the contoured body 212, as will be appreciated hereinafter.

Figure 8:
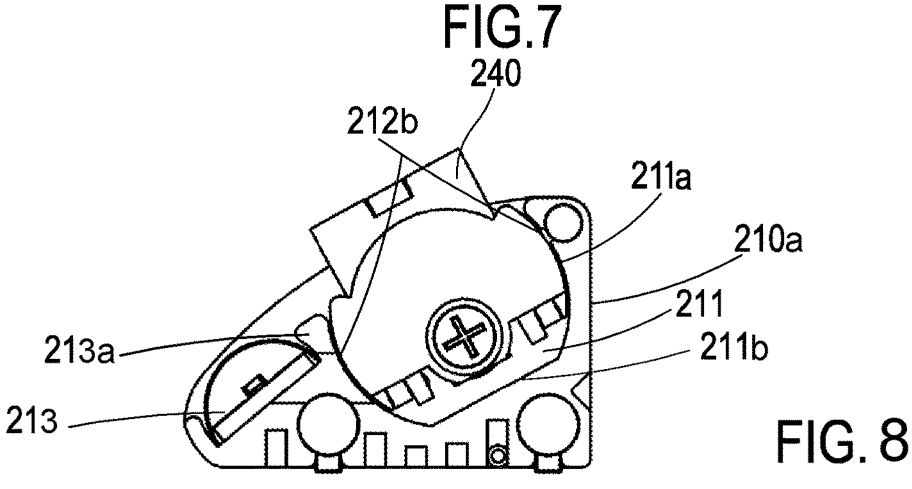
in FIG. 8: a schematic cross-section along the line VIII-VIII of FIG. 7.

As illustrated in FIG. 8, the longitudinal seat 211 of the contoured body 212 is preferably in the form of an "open C", having a curved rear arm 211*a* and a curved front arm, connected by a flat base 211*b*.

The flat base 211*b* may be inclined with respect to the vertical direction Z-Z and the transverse direction Y-Y, and, once assembled, may in particular be parallel to the plane of the printed circuit board 220*b* supporting the second light sources, in a "zero tilt", i.e. non-rotated, position thereof.

The longitudinal seat 211 may be obtained, in particular by means of extrusion, in a container body 210 having preferably a rear side 210*a* parallel to the vertical direction and a bottom side 210*b* parallel to the longitudinal X-X and transverse Y-Y directions.

As illustrated, the contoured body 212 for housing the second light sources, which may also be advantageously obtained by means of extrusion, may in particular have the housing seat 212*a* in the form of a "U" to house the printed circuit board 220*b*.

The front and rear outer walls 212*b* of the contoured body 212 are shaped as curved surfaces, arranged and configured for a form-fit coupling with the inner surfaces of the curved rear arms 211*a* of the longitudinal seat 211 of the container body 210; in particular, the C-shaped seat arms and the rear and front outer walls 212*b* of the contoured body 212 may have a corresponding curvature radius. Therefore, the contoured body 212 may be stably housed in the seat 211 of the container body 210 and be rotatable around a longitudinal axis, guided by the curved rear arms 211*a* of the longitudinal seat 211.

As illustrated, a cavity may be defined between the bottom face of the contoured body 212 and the flat base 211*b* of the longitudinal seat 211, the sizing of the cavity in particular allowing an adjustment of a rotation range of the contoured body 212 within the seat 211, the flat base 211*b* itself forming the end-of-travel stop thereof.

Figure 9:
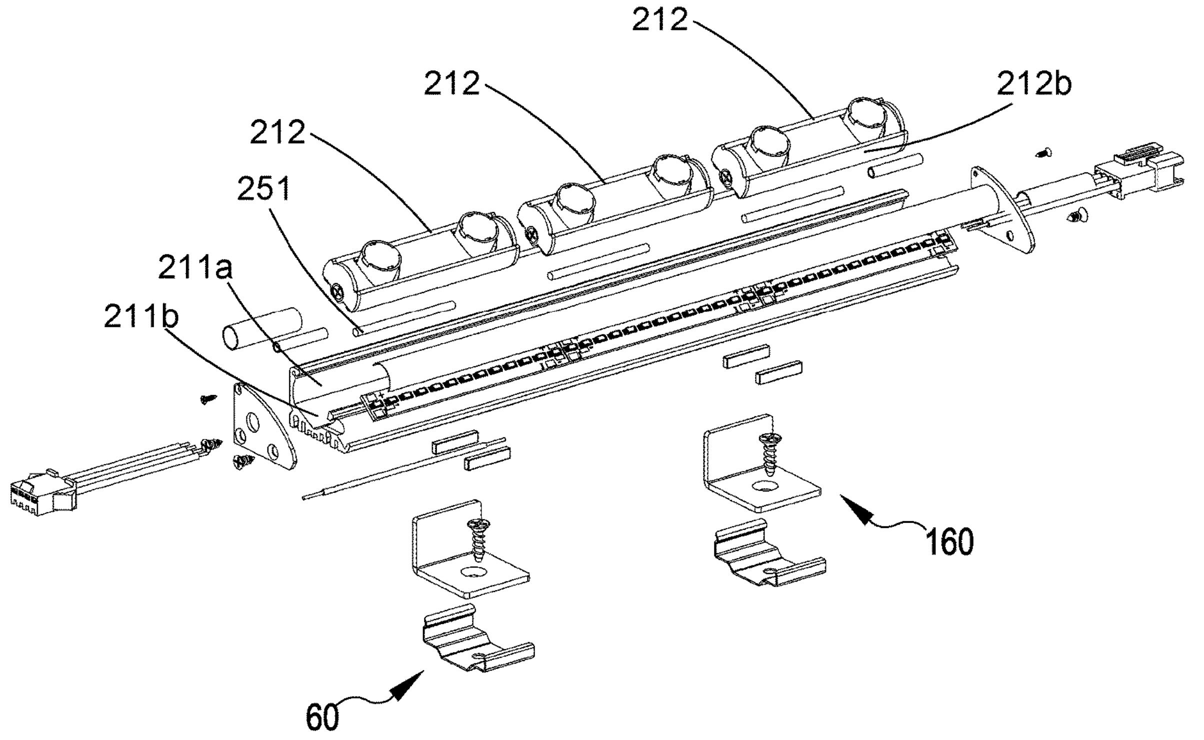
in FIG. 9: an exploded perspective view of a third exemplary embodiment of a lighting unit according to the present invention; and in FIG. 10: a front perspective view of the lighting unit of FIG. 9 in an assembled state.
Figure 10:
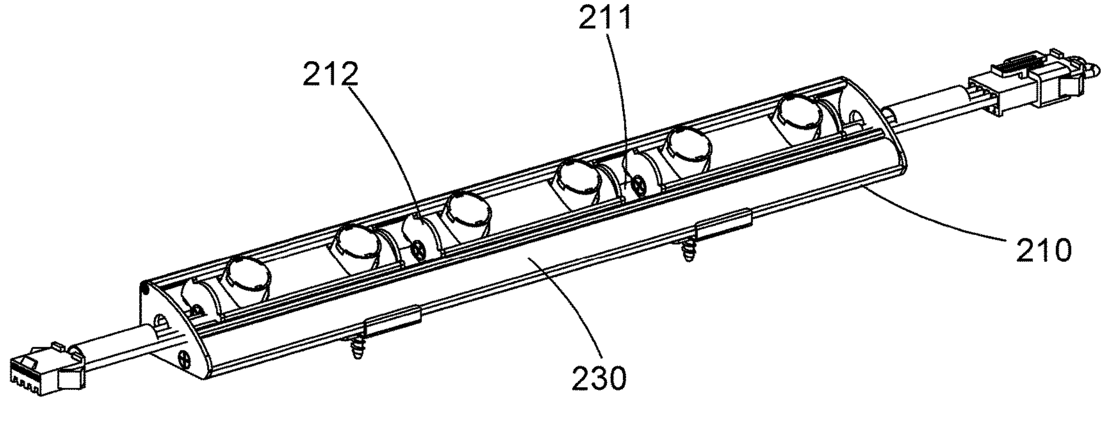

According to a preferred embodiment illustrated in FIGS. 9-10, there is provided a plurality of contoured bodies 212, arranged in series along the longitudinal direction within the longitudinal seat 211, to house the series of second light sources 222 within the container body 210.

One or more (and in particular at least two) of the series of second light sources 222 with respective optical element 240 may be housed in the housing 212*a* of a respective contoured body 212. Each contoured body 212 with one or more series of second light sources 222 may preferably be rotatable around the longitudinal axis independently of the other contoured bodies, thus allowing the orientation of each set of one or more series of second light sources 222 supported on a respective contoured body 212, independently of the other series of second light sources 222.

Advantageously, in this embodiment, the inner cavity defined between the flat base 211*b* of the longitudinal seat 211 and the contoured bodies 212 may preferably house passage sleeves 251 for passage of wiring for serial connection of the series of second light sources 222, arranged so as not to hinder the rotational motion of the individual contoured bodies 212 for support thereof.

Furthermore, it is advantageously possible to longitudinally translate a contoured body 212 with respect to the others, achieving a further degree of freedom in the positioning of the respective second light sources. However, the contoured bodies 212 are preferably fixed in the longitudinal direction to keep a constant pitch between second light sources, which is particularly desirable in order to achieve an improved aesthetic appearance.

In the embodiments of FIGS. 6-10, the longitudinal seat 213 for housing the first light sources may be closed by a respective diffuser 230 of the optical diffusion means, similarly to what is shown in relation to the interspace of the first embodiment of the invention.

As illustrated, such seat 213 is preferably in the form of a "U", with a base having a greater extent than the arms of the "U" and a smaller extent than the flat base 211*b* of the longitudinal seat 211 for housing the second light sources, from which it may be separated by a longitudinal partition 213*a* projecting outwardly in a direction substantially orthogonal to the surfaces of the flat base 211*b* of the seats 211, 213 and to the planes of the printed circuit boards.

The power supply means may be separated for the series of first and second light sources 221, 222, in case they are supported on separate printed circuit boards 220*a*, 220*b*.

The device according to the invention, incorporating in a single container body 210 two different light sources and means for diffusing and/or concentrating the light emitted therefrom, is therefore extremely compact; it may be implemented according to variable lengths by predetermining the extrusion conditions of the container body and the diffuser to be applied thereto, as well as the printed circuit board with respective light sources.

In addition to the foregoing, the relative distance between the second light sources 22 may be easily varied, said distance having a constant or variable pitch as required and/or preferred for determining the specific desired concentration with respect to the object to be lit.

The specific linear structure with pieces made by means of extrusion also allows for an easy and cost-effective manufacturing, as well as a quick assembly process, helping to contain production costs and sale price.

While having been described in the context of some embodiments and some preferred exemplary implementations of the invention, the scope of the present patent is intended to be solely determined by the following claims.

The invention claimed is:

1. A lighting unit comprising:

a container body having a first longitudinal seat and a second longitudinal seat formed therein;

at least one first printed circuit board;

a series of first light sources arranged on the at least one first printed circuit board;

at least one second printed circuit board;

a series of second light sources arranged on the at least one second printed circuit board;

power supply means for supplying power to the light sources;

first optical means for diffusing light emitted by the first light sources; and second optical means for at least one of concentrating or directing the light emitted by the second light sources, wherein the at least one first printed circuit board and the at least one second printed circuit board are respectively housed in the first and second longitudinal seats of the container body.

2. The lighting unit according claim 1, wherein the at least one first and the at least one second printed circuit boards are at least one of:

arranged on parallel planes;

arranged on the same plane;

arranged on planes that are inclined relative to a height direction and a transverse direction.

3. The lighting unit according to claim 1, wherein the container body has a rear side parallel to a height direction and a bottom side parallel to the longitudinal direction and to a transverse direction.

4. The lighting unit according to claim 1, wherein the first longitudinal seat for housing the first light sources is U-shaped and is closed by the first optical means; wherein the first longitudinal seat is separated from the second longitudinal seat of the container body by a longitudinal partition projecting outwardly substantially in a direction orthogonal to the printed circuit boards planes.

5. The lighting unit according to claim 1, wherein the series of first light sources and the series of second light sources are at least one of arranged on substantially parallel planes or arranged on a same plane.

6. The lighting unit according to claim 1, wherein the first light sources are arranged aligned along a first axis parallel to the longitudinal direction, and a relative distance between the first light sources is such as to cause an emission of light through the first optical means which is at least one of substantially continuous or uniform along the longitudinal extension of the series of first light sources.

7. The lighting unit according to claim 1, wherein the second light sources are arranged substantially aligned along a second axis parallel to the longitudinal direction, a respective optical element of said second optical means being associated with each second light source.

8. The lighting unit according to claim 1, wherein said container body is made by means of extrusion.

9. The lighting unit according to claim 1, wherein a relative distance between second light sources adjacent in the longitudinal direction is greater than a distance between adjacent first light sources.

10. The lighting unit according to claim 1, comprising power supply means configured to control at least one of an intensity or a color of the light emitted by the first and second light sources.

11. The lighting unit according to claim 1, characterized in that each second light source is associated with a corresponding optical element of the second optical means, which is coaxial with the respective light source.

12. The lighting unit according to claim 1, further comprising control means for remotely adjusting at least one of the intensity, color or direction of the light emitted by each light source.

13. The lighting unit according to claim 1, wherein the second longitudinal seat of the container body is C-shaped, with a curved rear arm connected by a base to a curved front arm.

14. The lighting unit according to claim 13, wherein the base of the second longitudinal seat is inclined with respect to a height direction and a transverse direction.

15. The lighting unit according to claim 1, further comprising a plurality of contoured bodies is arranged in series along the longitudinal direction within the second longitudinal seat, each contoured body supporting one or more second light sources with a respective second optical means.

16. The lighting unit according to claim 15, wherein each contoured body is at least one of configured to rotate around the longitudinal axis independently of the other contoured bodies or configured to translate in the longitudinal direction independently of the other contoured bodies.

17. The lighting unit according to claim 1, further comprising fixing means for fixing to a surface, comprising at least one of: a spring bracket provided with a hole for receiving fastening means for fastening to the surface, or a bracket with a first side provided with magnetic fixing means, and a second side inclined at an angle relative to the first side.

18. The lighting unit according to claim 17, wherein the first or second side of the bracket is provided with a hole for receiving fastening means for fastening to the surface.

19. The lighting unit according to claim 1, further comprising one or more contoured bodies, each including an upper housing seat for housing a respective second printed circuit board, wherein each contoured body is housed in the second longitudinal seat.

20. The lighting unit according to claim 19, wherein the second optical means include optical elements mountable on each contoured body, so that the second light sources and the respective optical elements can be assembled on the contoured body to form a single body designed to be inserted in a pre-assembled state in the second longitudinal seat of the container body.

21. The lighting unit according to claim 19, wherein each contoured body for housing the second light sources is formed by means of extrusion and has a U-shaped upper seat for housing the respective second printed circuit board.

22. The lighting unit according to claim 19, further comprising a cavity defined between a bottom face of a contoured body and the base of the second seat of the container body.

23. The lighting unit according to claim 19, wherein the one or more contoured bodies are housed in the second longitudinal seat so as to be rotatable about an axis parallel to the longitudinal direction.

24. The lighting unit according to claim 23, wherein the one or more contoured bodies are stably housed in the second longitudinal seat and rotationally guided around the longitudinal axis by means of a form-fit coupling between the second longitudinal seat and the contoured body.

25. The lighting unit according to claim 23, wherein each contoured body for the second light sources has curved front and rear outer walls arranged and configured for a form-fit coupling with inner surfaces of curved arms of a C-shaped second longitudinal seat.

26. A lighting units comprising:

a container body;

at least one printed circuit board;

a series of first light sources and a series of second light sources arranged on the at least one printed circuit board;

power supply means for supplying power to the light sources;

first optical means for diffusing light emitted by the first light sources; and second optical means for at least one of concentrating or directing the light emitted by the second sources, wherein said container body has a cross-section comprising a first half-body with arms and base defining a U-shape and a second half-body with a long side and a short side defining an overturned L-shape, wherein the long side of the second half-body is connected to one of the arms of the first half-body, and the long side has a length smaller than a width of the base of the first half-body, so as to leave an empty interspace between said short side and the other of said arms of the first half-body, the empty interspace being open opposite the base towards a front part of the lighting unit.

27. The lighting unit according to claim 26, wherein the series of first light sources and the series of second light sources are at least one of:

arranged on substantially parallel planes;

arranged on a same plane; or supported on a same printed circuit board.

28. The lighting unit according to claim 26, wherein the first light sources are arranged aligned along a first axis parallel to the longitudinal direction, and a relative distance between the first light sources is such as to cause an emission of light through the first optical means which is at least one of substantially continuous or uniform along the longitudinal extension of the series of first light sources.

29. The lighting unit according to claim 26, wherein said container body is made by means of extrusion.

30. The lighting unit according to claim 26, wherein the first light sources are aligned along an axis parallel to the longitudinal direction and so as to occupy an area with a width in the transverse direction which underlies the interspace, and wherein the interspace is closed on its front side by said first optical means so as to cause emission of light exiting the first optical means which is at least one of substantially continuous or uniform along the length of the lighting unit.

31. The lighting unit according to claim 26, wherein a relative distance between second light sources adjacent in the longitudinal direction is greater than a distance between adjacent first light sources.

32. The lighting unit according to claim 26, further comprising power supply means configured to control at least one of an intensity or color of the light emitted by the first and second light sources.

33. The lighting unit according to claim 26, further comprising control means for remotely adjusting at least one of the intensity, color or direction of the light emitted by each light source.

34. The lighting unit according to claim 26, wherein the second light sources are arranged substantially aligned along a second axis parallel to the longitudinal direction, and a respective optical element of said second optical means is associated with each second light source.

35. The lighting unit according to claim 34, wherein each second light source is associated with a corresponding optical element of the second optical means, which is arranged to be coaxial with the respective light source.

36. The lighting unit according to claim 26, further comprising fixing means for fixing to a surface, comprising at least one of: a spring bracket provided with a hole for receiving fastening means for fastening to the surface; or a bracket with a first side provided with magnetic fixing means, and a second side, inclined at an angle relative to the first side.

37. The lighting unit according to claim 36, wherein the first or second side of the bracket is provided with a hole for receiving fastening means for fastening to the surface.

* * * * *